I. E. PALMER.
Apparatus for Stretching Cloth, &c.
No. 148,082. Patented March 3, 1874.
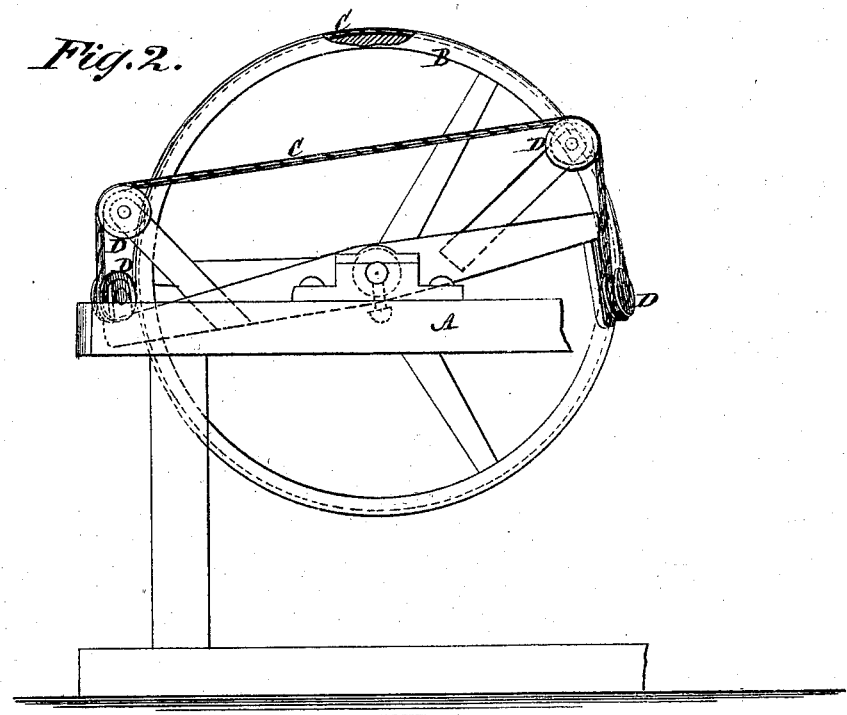
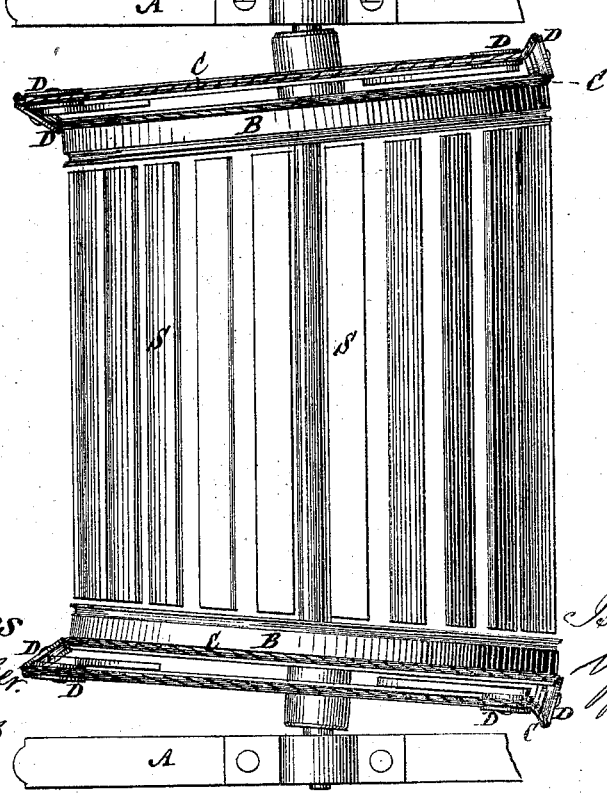

UNITED STATES PATENT OFFICE.

ISAAC E. PALMER, OF HACKENSACK, NEW JERSEY.

IMPROVEMENT IN APPARATUS FOR STRETCHING CLOTH, &c.

Specification forming part of Letters Patent No. 148,082, dated March 3, 1874; application filed March 24, 1873.

CASE B.

*To all whom it may concern:*

Be it known that I, ISAAC E. PALMER, of Hackensack, in the county of Bergen and State of New Jersey, have invented an Improvement in Apparatus for Stretching Cloth, Mosquito-Net and other Fabrics, of which the following is a specification:

This invention consists in a novel construction of selvage feeding and carrying devices, composed of endless traveling or revolving carriers and similarly-moving belts or bands arranged to hold the selvages or edges of the fabric in between them and the carriers, whereby a positive hold and feed of the fabric, free from all damage to the edges or selvages of it, is obtained, and, by the dispositions of said devices relatively to the feed of the fabric, the latter is stretched as required.

In the accompanying drawing which forms part of this specification, Figure 1 represents a plan of a cloth stretching and dressing apparatus, in part, having my improvement applied; and Fig. 2, a side view of one of the selvage carrying and stretching devices.

A A represent the side frames of an apparatus for stretching and dressing mosquito-net and other fabrics, which, in many or most of its features, may be similar to that described in Letters Patent No. 88,505, issued to me March 30, 1869—that is, it may include a stationary friction-frame or drag, S, to stretch the body or center portion of the fabric as the latter is passed over it to the drying-cylinder, but the selvage carrying and stretching devices, which constitute my present improvement, are different. Thus, instead of using card, toothed, or similar rolls, having their axes set so that said rolls occupy an oblique or diverging position relatively to the feed of the fabric, I employ comparatively smooth endless carrying devices or rolls B B at the ends of the stationary frame S. These rolls are arranged to revolve freely, and are placed at any desired obliquity, according to the required stretch of the fabric, and, if necessary, made adjustable toward or from each other to suit different widths of fabric. It is unimportant, however, as far as the principle of my invention is concerned, what relation or position these rolls B B occupy, so long as they effect the desired result of feeding and stretching the fabric as the latter is passed over them. By themselves, being smooth on their peripheries, they could neither feed nor stretch; but, in order to do so, they have associated with them an endless band, cord, or belt, C, of any suitable material and shape in its transverse section, and arranged to pass over so much of the periphery of the roll as is necessary to effect the feed and stretch of the fabric, said band, cord, or belt holding the edge or selvage of the fabric in between it and the roll, and traveling at the same velocity and in concert with the roll, so that there is no rubbing, wearing, or tearing action on the fabric.

If desired, the roll may be grooved circumferentially for reception of the band or cord, which latter is conducted to and from the roll and caused to move in concert with the latter by a suitable arrangement of guide-pulleys, D D, substantially as shown in Fig. 2 of the drawing. A tension-pulley or tightening device may be applied to the band to insure its travel in common with the roll.

To give a proper or sufficient hold of the fabric by the rolls B and bands C, either or both of said devices may be suitably roughened, or of a cushion construction on their contiguous surfaces.

What is here claimed, and desired to be secured by Letters Patent, is—

1. The combination of the diverging or obliquely-arranged carrying-rolls B B with the endless belts, bands, or cords C, and guides or guide-pulleys for directing the latter, the whole being arranged in relation with each other to effect feed and stretch of the fabric, as described.

2. The combination of the stationary friction frame or drag S with the obliquely-arranged carrying-rolls B B and the endless belts, bands, or cords C, substantially as and for the purpose herein set forth.

ISAAC E. PALMER.

Witnesses:
MICHAEL RYAN,
FRED. HAYNES.